Feb. 21, 1928.
J. C. NICHOLS
CLAMPING DEVICE
Filed March 10, 1923
1,659,921
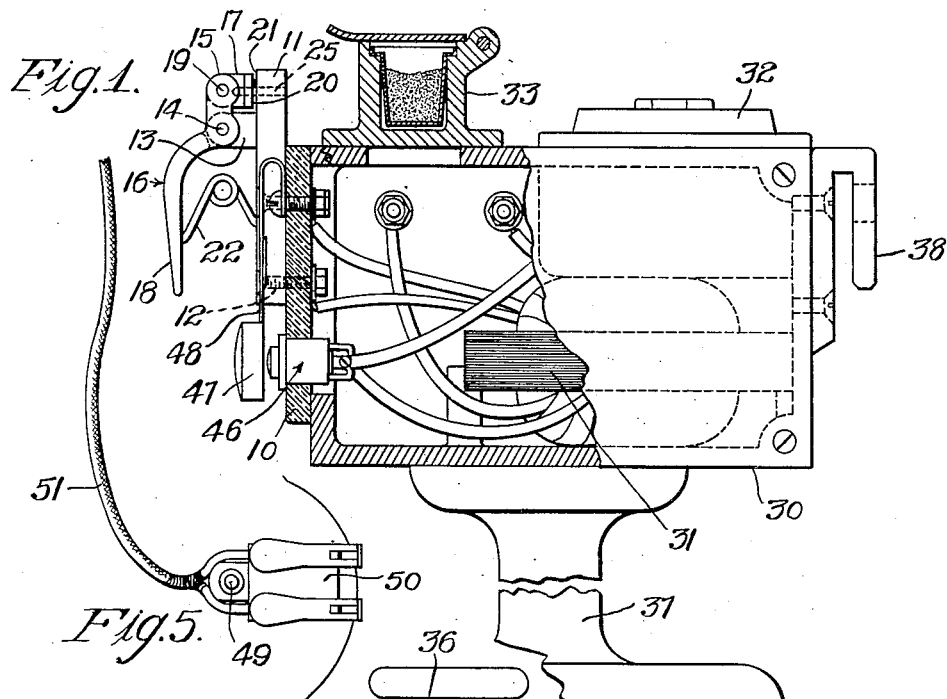
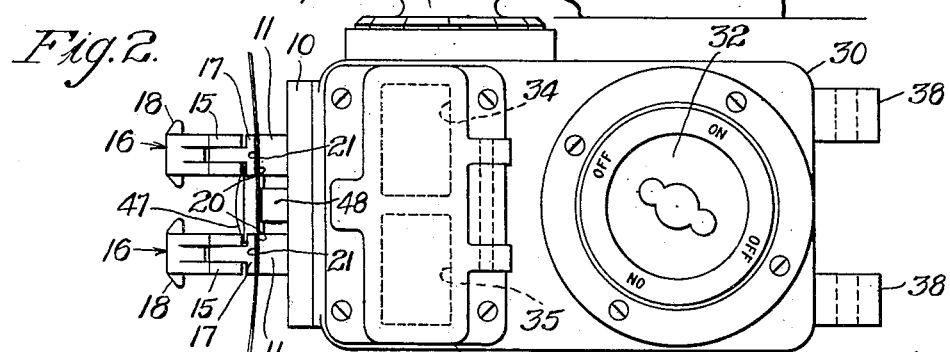
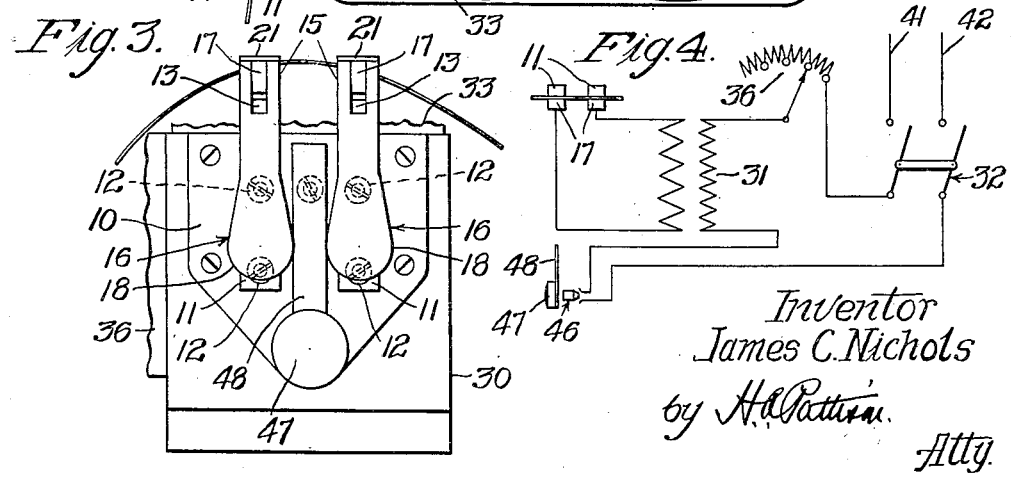
Inventor
James C. Nichols
by H. C. Patterson
Atty.

Patented Feb. 21, 1928.

1,659,921

UNITED STATES PATENT OFFICE.

JAMES CREIGHTON NICHOLS, OF CHICAGO, ILLINOIS, ASSIGNOR TO WESTERN ELECTRIC COMPANY, INCORPORATED, OF NEW YORK, N. Y., A CORPORATION OF NEW YORK.

CLAMPING DEVICE.

Application filed March 10, 1923. Serial No. 624,295.

This invention relates to improvements in clamping devices and more particularly to such a device which may be included in an electrical circuit and conduct current from the circuit to an article or articles held by the device.

An object of the invention is to provide a clamping device of this type which may be readily and quickly operated to clamp or release an article.

A feature of the invention resides in designing the movable member of the clamping device so that it is self-alining, insuring that the article will be securely held in position in the clamping device.

A clamping device made in accordance with the invention is particularly adapted for use with brazing apparatus for splicing wire, but it is to be understood that the improved clamping device may be used for a variety of other purposes without departing from the spirit and scope of the invention.

Other objects and advantages of the invention will more fully appear from the following detailed description and will be particularly pointed out in the appended claims.

In the accompanying drawings which illustrate the improved form of clamping device as applied to a brazing machine, Fig. 1 is a fragmentary side elevation, partly in section of a brazing mechanism with a pair of the improved form of clamping devices applied thereto;

Fig. 2 is a top plan view of the apparatus shown in Fig. 1;

Fig. 3 is a detail view in front elevation of the improved clamping devices;

Fig. 4 is a diagrammatic illustration of the circuit of the brazing mechanism showing how the clamping devices are included therein; and Fig. 5 is a detail view illustrating another use for the improved clamping device.

Referring now to the drawings in detail in which like reference numerals designate similar parts throughout the several views, 10 illustrates a base member, which supports the various elements of the clamping device. The base may be made of any suitable material, but where the clamping device is connected in an electrical circuit it is preferably made of insulating material such as rubber, bakelite, or the like. In the drawings two of the improved clamping devices are shown as spaced apart and secured to the base 10. Each clamping device comprises a narrow plate member 11 attached by bolts 12 to the base 10. The plate 11 has integral therewith an ear 13 projecting at right angles therefrom carrying a stud 14 (Fig. 1) upon which the bifurcated end 15 of a lever 16 is pivotally mounted. The lever 16 is bell crank in form and includes a handle 18 and the bifurcated portion 15. The bifurcated portion 15 straddles one arm of a T-shaped member 17 pivoted thereto on a stud 19. One face of the member 17 forms a gripping surface 20 which co-operates with the adjacent face 21 of the plate 11 constituting a second gripping surface, and the articles to be clamped are gripped between these two gripping surfaces.

The gripping surfaces of the T member 17 and the plate 11 are normally held in contact by a spring 22, the ends of which fit within suitable recesses (not shown) in the plate 11 and handle 18 so that it may be readily removable and replaceable by other springs having greater or lesser strength as may be selected, depending upon the pressure desired between the gripping surfaces of the jaw members. In order to insure that the gripping surfaces of the T members 17 and plate 11 will be positioned parallel with each other in clamping an article therebetween, a pin 25 is secured to the T member which enters an opening in the plate 11, the pin and opening being so disposed as to position the gripping surfaces of the T member and plate in exactly parallel positions.

Where the improved clamping devices are used in connection with a brazing apparatus for splicing wire, the ends of the two wires to be joined are clamped between the gripping surfaces of the two pairs of clamping jaws, so that their ends abut as shown in Figs. 2, 3 and 5, the clamping devices being made of material such as bronze or copper which will offer small resistance to the passage of an electrical current. A source of electric current of proper amperage and voltage is then connected across the pairs of clamping jaws, and since these jaws are bridged by the wires to be brazed, the said wires become heated to such a temperature that upon application of a proper flux and solder, the ends are brazed together, as is well understood by those skilled in the art.

When used with a brazing apparatus, the base 10 of insulating material carrying the two improved clamping devices may be attached to the brazing apparatus in the manner illustrated in Fig. 1. The brazing apparatus shown in the drawings comprises a box-like receptacle 30 within which a transformer 31 and a suitable type of switch 32 are mounted, while attached to the top of the receptacle is a box 33 carrying cups 34 and 35 (Fig. 2) containing water and a suitable flux, such as borax, respectively. Also supported by the receptacle 30 is a suitable rheostat 36. The brazing apparatus is illustrated as being mounted upon the upper end of a pedestal 37 which may be portable so that the brazing apparatus may be moved adjacent the point where the braze is to be made. In place of the pedestal 37 the apparatus may be suitably supported by hooks 38 attached to the receptacle 30.

The electrical circuit for the apparatus shown in Fig. 1 is illustrated in Fig. 4. In this circuit the switch 32 serves to connect and disconnect the apparatus from leads 41 and 42 connected with any suitable source of alternating current. The rheostat 36 is adjusted to regulate the flow of current in the primary of the transformer 31 so that the induced current in the secondary of the transformer is of the proper amperage and voltage. As an example, where the apparatus is used for brazing wires ranging from No. 24 to 19 B. & S. gauge the rheostat is adjusted so that the current through the secondary and consequently across the wires to be brazed is from approximately 30 to approximately 85 amperes at a pressure of not over 1.1 volts. The primary circuit of the transformer is closed by a switch 46 which may be of any suitable type but is illustrated as being of the push button type, the button thereof being actuated by a second and larger button 47 mounted on the end of a spring 48 secured to the plate 10 between the two clamping devices as shown in Fig. 3.

In some instances it may be found desirable to mount the improved clamping devices on a support of the type illustrated in Fig. 5. In this construction the clamping devices and a switch 49 similar to the switch 46 are mounted on a base member 50 similar to the base 10, the clamping devices being connected by suitable leads 51 with the transformer and rheostat (not shown), which may be mounted in any suitable and convenient place, the clamping devices and switch being portable as a unit and usable as a tool for holding wires to be brazed. A tool of this type has especial utility for use in splicing the conductors of stranded cable, the tool being inserted between the strands of the cable to hold any particular strand that it is desirable to splice with a brazed joint.

What is claimed is:

1. The combination with apparatus for electrically brazing parts, of a clamping device for holding a part to be brazed, said clamping device comprising a pair of pivotally interconnected jaw members adapted to make electrical contact with the part to be brazed, one of said jaw members having a gripping surface to contact with said part, a member pivoted to the other jaw member and having a gripping surface to contact with said part, and means for maintaining said gripping surfaces in parallel relationship during a relative movement of the jaw members about their pivotal interconnection to cause a uniform contact in any position of said part.

2. The combination with apparatus for electrically brazing parts, of a clamping device for holding a part to be brazed, said clamping device comprising a pair of pivotally interconnected jaw members adapted to make electrical contact with the part to be brazed, one of said jaw members having a gripping surface to contact with said part, a member pivoted to the other jaw member and having a gripping surface movable into and out of contact with the said part, means for maintaining said gripping surfaces in parallel relationship during said movement to cause a uniform contact in any position of said part, and spring means for normally holding said gripping surfaces in contact with the part to be brazed.

3. The combination with apparatus for electrically brazing parts, of a clamping device for holding a part to be brazed, said clamping device comprising a pair of pivotally interconnected jaw members adapted to make electrical contact with the part to be brazed, one of said jaw members having a gripping surface to contact with said part, a gripping member pivoted to the other jaw member and having a gripping surface to contact with said part, and means for maintaining said gripping surfaces in parallel relationship during a relative movement of the jaw members about their pivotal interconnection to make a uniform contact in any position of said part, said means comprising a pin carried by the gripping member and adapted to enter an opening in the clamping jaw when the gripping surfaces approach each other to thereafter maintain said gripping surfaces in parallel relationship.

4. The combination with apparatus for electrically brazing parts, of a clamping device for holding a part to be brazed, said clamping device comprising a pair of pivotally interconnected jaw members having gripping surfaces in opposed parallel relation, means for varying the distance between the surfaces to clamp a part, and means for maintaining the surfaces in said opposed, parallel relation causing them to contact with a part of uniform thickness at all points.

5. The combination with apparatus for electrically brazing parts, of a pair of clamping devices provided with gripping surfaces to contact with the parts to be brazed, means to maintain the gripping surface of each clamping device parallel to the gripping surface of the other clamping device upon a relative movement of the clamping devices to form a uniform contact with a part to be welded, and means to cause an electric current to flow through the clamping devices to the parts to braze the parts.

In witness whereof, I hereunto subscribe my name this 27th day of February A. D., 1923.

JAMES CREIGHTON NICHOLS.